(12) United States Patent
Narayanaswamy et al.

(10) Patent No.: US 8,484,385 B2
(45) Date of Patent: *Jul. 9, 2013

(54) APPLICATION IDENTIFICATION

(75) Inventors: Krishna Narayanaswamy, San Jose, CA (US); Siying Yang, Burlingame, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/616,333

(22) Filed: Sep. 14, 2012

(65) Prior Publication Data

US 2013/0074144 A1    Mar. 21, 2013

Related U.S. Application Data

(63) Continuation of application No. 13/092,532, filed on Apr. 22, 2011, now Pat. No. 8,321,595, which is a continuation of application No. 11/682,993, filed on Mar. 7, 2007, now Pat. No. 7,953,895.

(51) Int. Cl.
*G06F 15/16*      (2006.01)

(52) U.S. Cl.
USPC ........... 709/250; 709/224; 709/230; 370/230; 370/389

(58) Field of Classification Search
USPC .................. 709/224, 230, 250; 370/230, 389
See application file for complete search history.

(56) References Cited

U.S. PATENT DOCUMENTS

| | | | |
|---|---|---|---|
| 5,781,550 A | 7/1998 | Templin et al. | |
| 5,842,040 A | 11/1998 | Hughes et al. | |
| 5,845,068 A | 12/1998 | Winiger | |
| 5,889,777 A | 3/1999 | Miyao et al. | |
| 5,909,686 A | 6/1999 | Muller et al. | |
| 6,011,803 A | 1/2000 | Bicknell et al. | |
| 6,029,203 A | 2/2000 | Bhatia et al. | |
| 6,049,528 A | 4/2000 | Hendel et al. | |
| 6,088,356 A | 7/2000 | Hendel et al. | |
| 6,098,172 A | 8/2000 | Coss et al. | |
| 6,141,749 A | 10/2000 | Coss et al. | |
| 6,154,775 A | 11/2000 | Coss et al. | |
| 6,170,012 B1 | 1/2001 | Coss et al. | |
| 6,182,146 B1 | 1/2001 | Graham-Cumming, Jr. | |
| 6,367,009 B1 | 4/2002 | Davis et al. | |
| 6,591,303 B1 | 7/2003 | Hendel et al. | |
| 6,606,315 B1 | 8/2003 | Albert et al. | |
| 6,633,560 B1 | 10/2003 | Albert et al. | |
| 6,650,641 B1 | 11/2003 | Albert et al. | |
| 6,704,278 B1 | 3/2004 | Albert et al. | |
| 6,735,169 B1 | 5/2004 | Albert et al. | |

(Continued)

OTHER PUBLICATIONS

Julkunen et al., "Enhance Network Security with Dynamic Packet Filter", IEEE (1998), pp. 268-275.

(Continued)

*Primary Examiner* — Wing F Chan
*Assistant Examiner* — Tesfay Yohannes
(74) *Attorney, Agent, or Firm* — Harrity & Harrity, LLP (57) ABSTRACT

A method may include receiving a communication from a client device and identifying a port number, a protocol and a destination associated with the communication. The method may also include identifying a first application being executed by the first client device based on the port number, the protocol and the destination associated with the first communication.

20 Claims, 6 Drawing Sheets

U.S. PATENT DOCUMENTS

| | | | |
|---|---|---|---|
| 6,742,045 | B1 | 5/2004 | Albert et al. |
| 6,775,692 | B1 | 8/2004 | Albert et al. |
| 6,975,592 | B1 * | 12/2005 | Seddigh et al. ............... 370/230 |
| 6,990,588 | B1 | 1/2006 | Yasukura |
| 7,032,037 | B2 | 4/2006 | Garnett et al. |
| 7,042,870 | B1 | 5/2006 | Albert et al. |
| 7,051,066 | B1 | 5/2006 | Albert et al. |
| 7,143,438 | B1 | 11/2006 | Coss et al. |
| 7,346,686 | B2 | 3/2008 | Albert et al. |
| 7,467,205 | B1 * | 12/2008 | Dempster et al. ............. 709/224 |
| 7,493,623 | B2 | 2/2009 | Ruutu |
| 7,535,907 | B2 | 5/2009 | Hussain et al. |
| 7,643,481 | B2 | 1/2010 | Kadambi et al. |
| 7,752,202 | B2 * | 7/2010 | Kobori et al. ................. 707/736 |
| 7,778,254 | B2 | 8/2010 | Kadambi et al. |
| 7,835,313 | B2 | 11/2010 | Joung et al. |
| 7,843,843 | B1 * | 11/2010 | Papp et al. .................... 370/252 |
| 7,843,869 | B2 | 11/2010 | Ikawa et al. |
| 7,895,431 | B2 | 2/2011 | Bouchard et al. |
| 7,953,895 | B1 | 5/2011 | Narayanaswamy et al. |
| 8,023,413 | B2 | 9/2011 | Kadambi et al. |
| 8,321,595 | B2 | 11/2012 | Narayanaswamy et al. |
| 2003/0112802 | A1 | 6/2003 | Ono et al. |
| 2004/0133781 | A1 | 7/2004 | Guillou |
| 2004/0268149 | A1 | 12/2004 | Aaron |
| 2005/0012592 | A1 | 1/2005 | Debelleix |
| 2005/0060418 | A1 * | 3/2005 | Sorokopud .................... 709/230 |
| 2005/0104719 | A1 | 5/2005 | Ramamurthy et al. |
| 2005/0105557 | A1 * | 5/2005 | Yamane et al. ................ 370/474 |
| 2005/0223277 | A1 * | 10/2005 | Ballard ............................ 714/15 |
| 2005/0278459 | A1 * | 12/2005 | Boucher et al. ................ 709/250 |
| 2006/0018301 | A1 | 1/2006 | Schrufer |
| 2006/0031472 | A1 | 2/2006 | Rajavelu et al. |
| 2006/0056291 | A1 | 3/2006 | Baker et al. |
| 2006/0126618 | A1 | 6/2006 | Pennock et al. |
| 2006/0153296 | A1 | 7/2006 | Deng |
| 2006/0221977 | A1 * | 10/2006 | Basso et al. ............. 370/395.32 |
| 2006/0236370 | A1 | 10/2006 | John et al. |
| 2007/0067046 | A1 * | 3/2007 | Berg ................................. 700/1 |
| 2007/0300289 | A1 | 12/2007 | Tanizawa et al. |
| 2008/0031171 | A1 | 2/2008 | Joung et al. |
| 2008/0031235 | A1 * | 2/2008 | Harris et al. ................... 370/389 |
| 2008/0215669 | A1 | 9/2008 | Gaddy et al. |

OTHER PUBLICATIONS

Sharp et al., "Starburst: Building Next-Generation Internet Devices", Bell Labs Technical Journal 6(2), pp. 6-17, (2002).

* cited by examiner

//APPLICATION IDENTIFICATION

RELATED APPLICATION

This application is a continuation of U.S. patent application Ser. No. 13/092,532, filed Apr. 22, 2011 which is a continuation of U.S. patent application Ser. No. 11/682,993, filed Mar. 7, 2007, now U.S. Pat. No. 7,953,895, the entire disclosures of which are incorporated herein by reference.

BACKGROUND

1. Field of the Invention

Implementations described herein relate generally to network communications and, more particularly, to identifying applications associated with network communications.

2. Description of Related Art

Attacks on networks and unauthorized access to network resources have become an increasing problem for entities that are responsible for maintaining network security and providing access to network resources to a number of users. For example, an attack originating from a single user/node may result in a network being unable to provide legitimate users with the desired services and may even result in the network crashing.

As a result, network security devices typically limit access to network resources based on various authentication procedures designed to limit access to only authorized users executing approved applications. One problem with granting access to a client device in this manner is that it typically takes considerable processing resources to determine whether the client device is an authorized user executing an approved application. In addition, conventional authorization procedures do not scale well for high speed networks.

SUMMARY

According to one aspect, a method is provided. The method includes receiving a first communication from a first client device and identifying a destination port number, a protocol and a destination address associated with the first communication. The method also includes identifying a first application being executed by the first client device based on the destination port number, the protocol and the destination address associated with the first communication.

According to another aspect, a first network device may include at least one memory configured to store a first database including information identifying port information, protocol information and destination address information associated with each of a plurality of applications. The first network device may also include processing logic coupled to the memory. The processing logic may be configured to receive a first communication from a first client device and identify a port number and at least one of a protocol or a destination associated with the first communication. The processing logic may also be configured to access the first database to identify a first application being executed by the first client device based on the port number and at least one of the protocol or the destination associated with the first communication.

According to still another aspect, a computer-readable medium having stored thereon sequences of instructions which, when executed by a processor, cause the processor to receive a first communication from a first client device and identify a destination port number, a protocol and a destination address associated with the first communication. The instructions also cause the processor to identify a first application being executed by the first client device based on the destination port number, the protocol and the destination address associated with the first communication.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims and equivalents.

Exemplary Network

Figure 1:
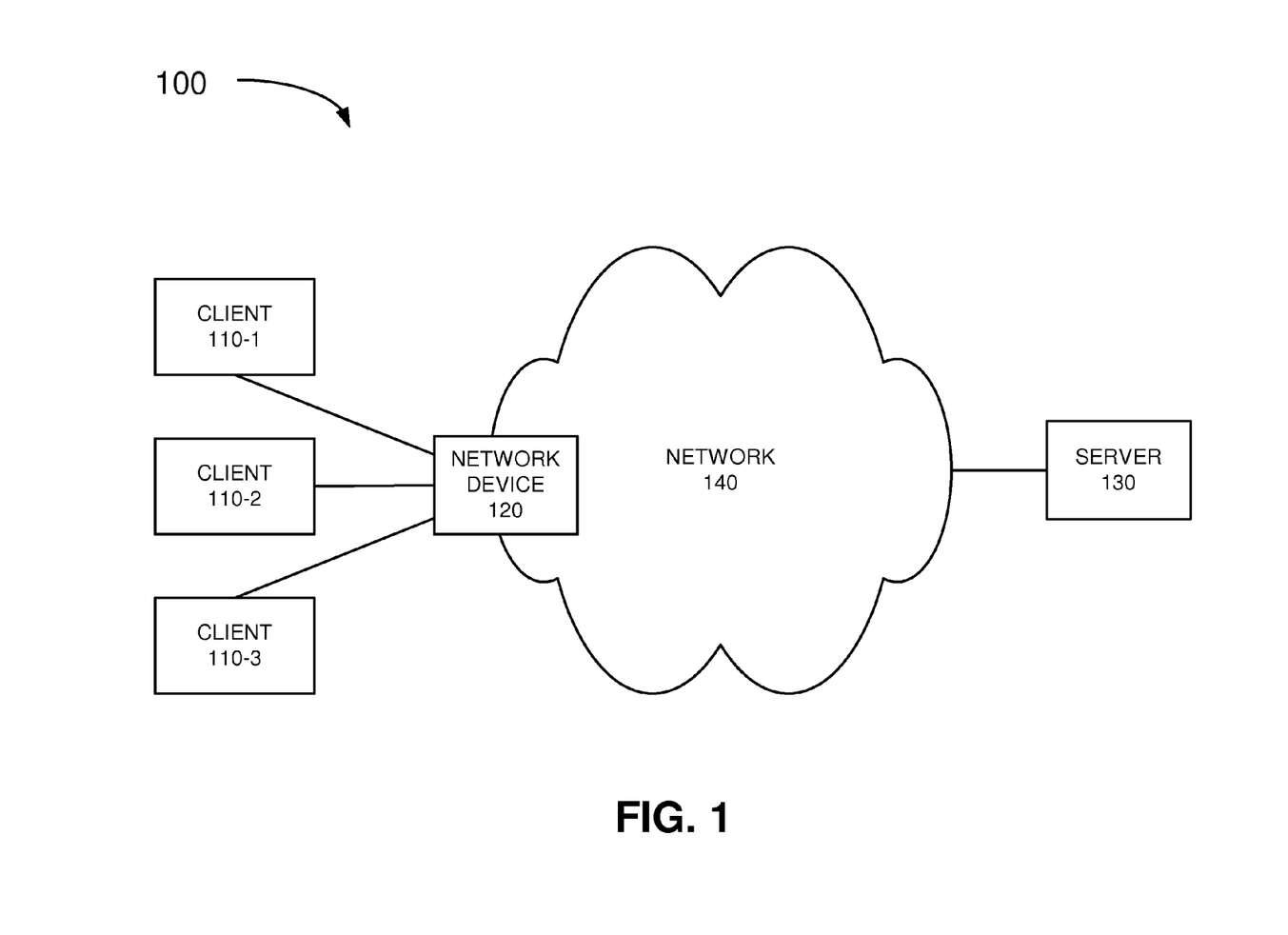
FIG. 1 is a diagram of an exemplary network in which systems and methods described herein may be implemented.

FIG. 1 is a diagram of an exemplary network 100 in which systems and methods described herein may be implemented. Network 100 may include clients 110-1, 110-2, 110-3 (referred to herein collectively as clients 110), network device 120, server 130 and network 140. The exemplary configuration illustrated in FIG. 1 is provided for simplicity. It should be understood that a typical network may include more or fewer devices than illustrated in FIG. 1. In addition, other devices that facilitate communications between the various entities illustrated in FIG. 1 may also be included in network 100.

Clients 110 may each include a device, such as a personal computer, a laptop computer, a personal digital assistant (PDA), a web-based appliance, a wireless telephone or another type of computation or communication device, or a process running on one of these devices. Clients 110 may communicate with server 130 over network 140 via wired, wireless or optical connections.

Network device 120 may include a firewall device, an intrusion detection system, a router, a server, or another device that performs security related functions associated with accessing resources in network 100, such as server 130 and/or resources associated with server 130. In an exemplary implementation, network device 120 may identify an application associated with communications from clients 110 and apply access policies associated with the identified application to determine whether to grant access to the desired resource, as described in detail below. Network device 120 may also dynamically update application related information associated with applications executed by clients 110 to facilitate determinations associated with granting, denying or limiting access to various resources, as described in detail below.

Server 130 may include a server/computing device, or a set of servers/computing devices, that provides clients 110 with access to various resources in network 100. In some implementations, the network resources reside on server 130. In other implementations, the network resources may be located externally with respect to server 130 (not shown in FIG. 1).

Network 140 may include one or more networks, such as a local area network (LAN) or a private network, such as a company network or intranet. Network 140 may also include a wide area network (WAN), a metropolitan area network (MAN), a telephone network, such as the Public Switched Telephone Network (PSTN), the Internet, a cellular network, a satellite network, another type of network or a combination of networks.

Exemplary Device Architecture

Figure 2:
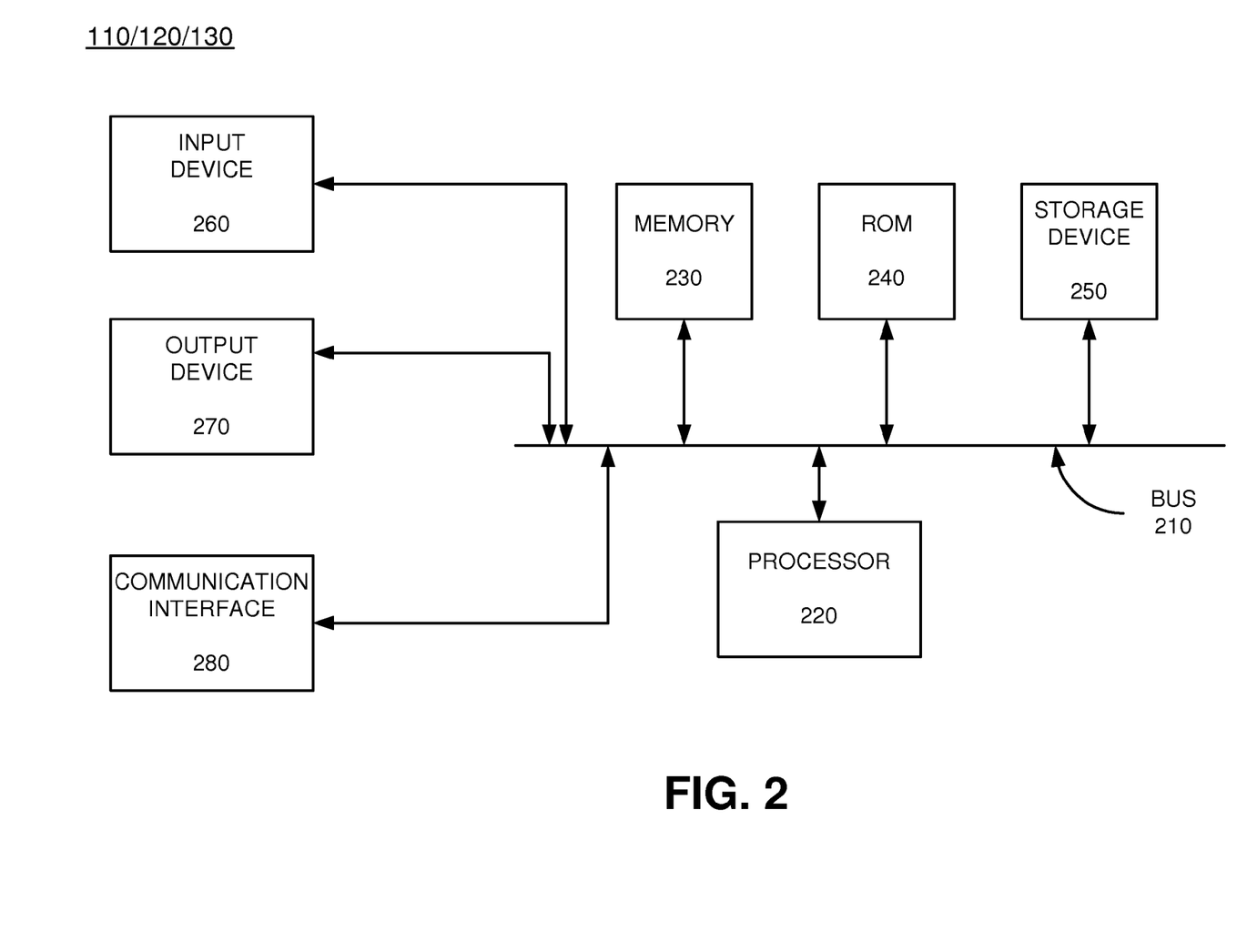
FIG. 2 is a block diagram illustrating an exemplary configuration of a client, the network device and the server of FIG. 1.

FIG. 2 illustrates an exemplary configuration of network device 120. Clients 110 and server 130 may be configured in a similar manner. Network device 120 may include a bus 210, a processor 220, a main memory 230, a read only memory (ROM) 240, a storage device 250, an input device 260, an output device 270, and a communication interface 280. Bus 210 may include a path that permits communication among the elements of network device 120.

Processor 220 may include a processor, microprocessor, application specific integrated circuit (ASIC), field programmable gate array (FPGA) or processing logic that may interpret and execute instructions. Memory 230 may include a random access memory (RAM) or another type of dynamic storage device that may store information and instructions for execution by processor 220. ROM 240 may include a ROM device or another type of static storage device that may store static information and instructions for use by processor 220. Storage device 250 may include a magnetic and/or optical recording medium and its corresponding drive.

Input device 260 may include a mechanism that permits an operator to input information to network device 120, such as a keyboard, a mouse, a pen, voice recognition and/or biometric mechanisms, etc. Output device 270 may include a mechanism that outputs information to the operator, including a display, a printer, a speaker, etc. Communication interface 280 may include any transceiver-like mechanism that enables network device 120 to communicate with other devices and/or systems. For example, communication interface 280 may include a modem or an Ethernet interface to a LAN. Alternatively, communication interface 280 may include other mechanisms for communicating via a network, such as network 140.

Network device 120 may perform processing associated with identifying applications executed by clients 110 and providing access management, as described in detail below. According to an exemplary implementation, network device 120 may perform these operations in response to processor 220 executing sequences of instructions contained in a computer-readable medium, such as memory 230. A computer-readable medium may be defined as a physical or logical memory device and/or carrier wave.

The software instructions may be read into memory 230 from another computer-readable medium, such as data storage device 250, or from another device via communication interface 280. The software instructions contained in memory 230 may cause processor 220 to perform processes that will be described later. Alternatively, hard-wired circuitry may be used in place of or in combination with software instructions to implement processes described herein. Thus, implementations described herein are not limited to any specific combination of hardware circuitry and software.

Figure 3:
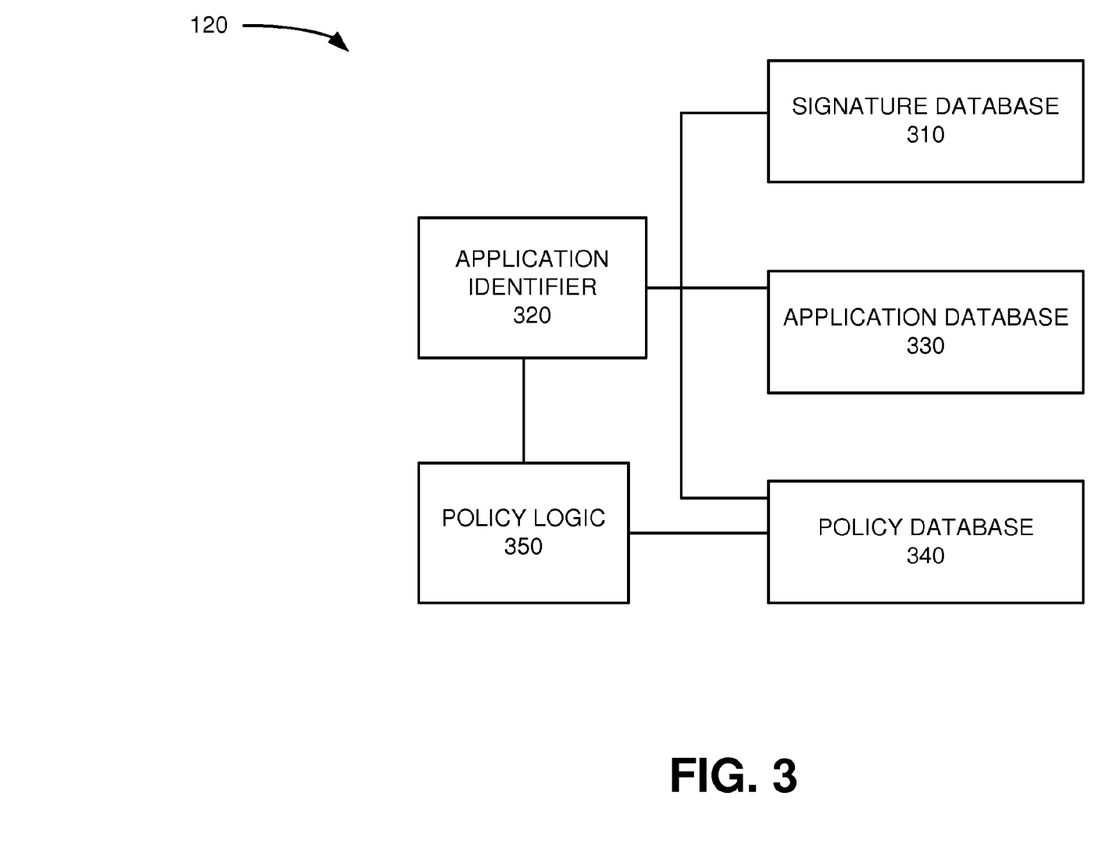
FIG. 3 is an exemplary functional block diagram of components implemented in the network device of FIG. 2.

FIG. 3 is an exemplary functional block diagram of elements implemented in network device 120. Referring to FIG. 3, network device 120 may include signature database 310, application identifier 320, application database 330, policy database 340 and policy logic 350. One or more of these elements in network device 120 may be implemented in, for example, software stored in memory 230 and executed by processor 220. Alternatively, one or more of these elements may be implemented in hardware or a combination of hardware and software.

Signature database 310 may store information associated with various software applications that may be executed by clients 110. These applications may include peer-to-peer (P2P) applications, client-server applications, or other application that may be executed by clients 110. In an exemplary implementation, signature database 310 may store signature information associated with various applications, along with information identifying the particular application. The terms "signature information" and "signature" as used herein refer to characteristic information identifying, for example, data patterns, strings, expressions, etc., that are associated with various applications and may be used to identify applications being executed by clients 110.

Application identifier 320 may include logic that receives data transmitted in network 100, such as data transmitted from clients 110 to server 130 and vice versa, and identifies an application executed by a particular client 110. For example, application identifier 320 may receive one or more data packets from client 110-1, compare information in the data packet(s) to information in signature database 310 and identify the application being executed by client 110-1 by matching information in the packet(s) transmitted from client 110-1 to information in signature database 310.

In an exemplary implementation, application identifier 320 may include deterministic finite automaton (DFA) logic and/or perl compatible regular expression (PCRE) logic that searches for a pattern and/or a regular expression (regex) in signature database 310 that matches a signature (e.g., a pattern, expression, string, etc.) in one or more client-to-server (CTS) packets sent from client 110-1. Application identifier 320 may also examine one or more server-to-client (STC) packets sent from server 130 to client 110-1 to verify the application executed by client 110-1, as described in more detail below.

Application database 330 may store information identifying applications that may be executed by various clients 110 along with other information associated with the particular applications. The information in application database 330 may then be used by application identifier 320 to quickly identify a particular application being executed by one of clients 110.

Figure 4:
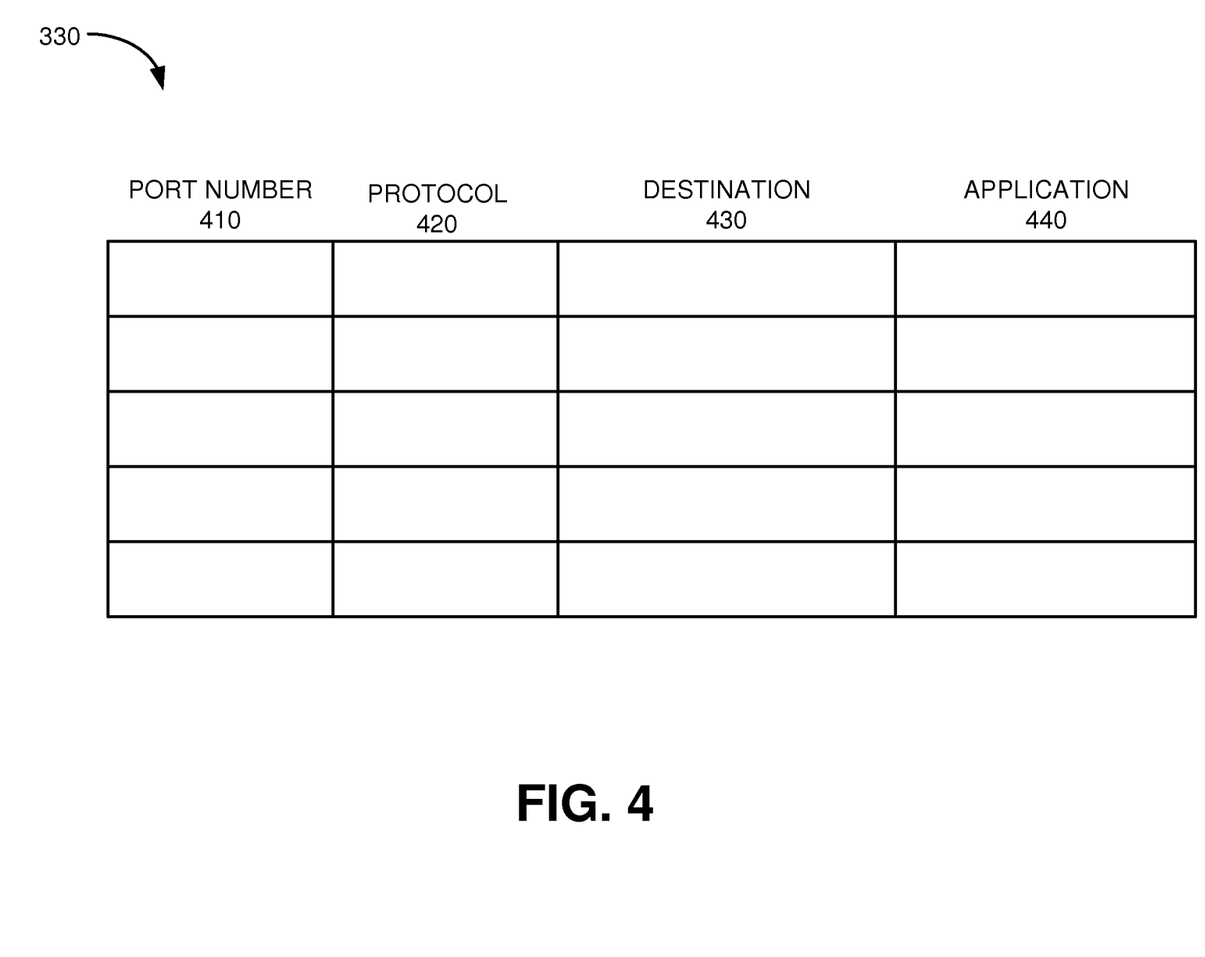
FIG. 4 illustrates an exemplary implementation of the application database of FIG. 3.

For example, FIG. 4 illustrates an exemplary implementation of application database 330. Referring to FIG. 4, application database 330 may include port number field 410, protocol field 420, destination field 430 and application field 440. Port number field 410 may include information identifying a destination port number associated with data packets transmitted from clients 110. The destination port number may be included in the header of a transmission control protocol/Internet protocol (TCP/IP) packet and may represent a destination port on a destination device, such as a destination port on server 130. Protocol field 420 may represent a protocol associated with the data packets transmitted from clients 110. The protocol information may also be included in the header of the packet. Exemplary protocols include TCP, user datagram protocol (UDP) and any number of additional protocols used in network communications.

Destination field 430 may represent a destination associated with data packets transmitted from clients 110. For example, destination field 430 may represent a destination server, such as server 130. In this case, destination field 430 may include an IP address, such as an IP address associated with server 130 or IP addresses associated with other servers (not shown) in network 100.

Application field 440 may represent the application associated with the particular port number, protocol and destination information stored in fields 410, 420 and 430. In an exemplary implementation, once an application associated with server 130 and being executed by client 110, such as client 110-1, has been identified by application identifier 320, application identifier 320 may store the port number, protocol and destination information associated with the communication from client 110-1 in fields 410, 420 and 430, along with the identified application in application field 440, as described in more detail below.

Referring back to FIG. 3, policy database 340 may store various access policies and/or rules associated with accessing server 130 and/or resources associated with server 130. For example, policy database 340 may store information indicating that clients 110 running a particular application must be running anti-virus software, anti-spyware software, etc. Policy database 340 may also store rules indicating a maximum amount of data that client 110-1 may transmit and/or receive (e.g., a maximum bandwidth) when executing a particular application. Policy database 340 may store any other access rules/policies associated with accessing resources on network 100, such as server 130, based on the particular network and resources being accessed.

Policy logic 350 may include logic that receives information from application identifier 320 that identifies a particular application being executed by one of clients 110, such as client 110-1. Policy logic 350 may then access policy database 340 and identify particular rules and/or access policies associated with the particular application. Policy logic 350 may then apply the particular access rules/policies to the communication session initiated by client 110-1 with server 130 to ensure that client 110-1 is in compliance with the particular access policies, as described in detail below.

Exemplary Processing

Figure 5:
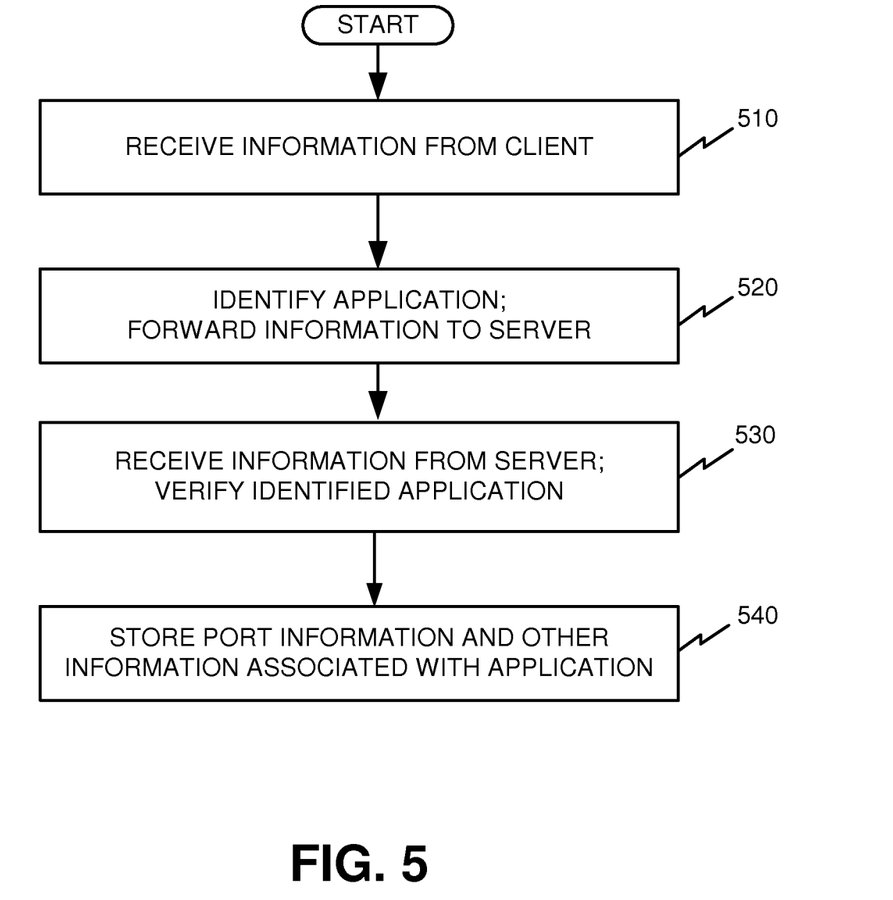
FIG. 5 is a flow diagram illustrating exemplary processing associated with storing application related information in the application database of FIG. 3.

FIG. 5 is a flow diagram illustrating exemplary processing associated with identifying applications in network 100. Processing may begin with a client, such as client 110-1, attempting to contact or access server 130. Network device 120 may receive the communication from client 110-1 (act 510). For example, network device 120 may be configured to receive and/or filter access requests from a number of clients 110 that are intended for server 130. In some implementations, network device 120 may be an edge device (e.g., an edge router, an edge intrusion detection systems, edge firewall, etc.) or may be included in an edge device that is configured to receive requests associated with a number of clients 110 that are intended for server 130.

Network device 120 may then examine one or more packets from client 110-1 to identify the application being executed by client 110-1 (act 520). For example, as discussed above, application identifier 320 may receive one or more CTS packets from client 110-1 and compare information in the received CTS packet(s) to information in signature database 310 to attempt to identify the application being executed by client 110-1. In an exemplary implementation, application identifier 320 may identify the application by performing a pattern matching algorithm, such as a DFA algorithm, a PCRE algorithm, or another algorithm to identify patterns, expressions, strings, etc., used in the communication from client 110-1 that match or correspond to a signature stored in signature database 310. For example, application identifier 320 may search signature database 310 using the initial CTS packet from client 110-1 for a pattern or regex that matches a pattern or expression included in the CTS communication.

Assume that application identifier 320 identifies a match in signature database 310, such as a match corresponding to a P2P application. After identifying the application being executed by client 110-1, network device 120 may forward the CTS communication to server 130 via network 140 (act 520).

Server 130 may receive the communication from client 110-1 and send a response to client 110-1. For example, server 130 may send an acknowledgement message to client 110-1 indicating that the request for access has been received. The response message may include additional information for facilitating a communication session between client 110-1 and server 130 and/or facilitating a communication session with another client, such as client 110-2 if the application is a P2P application.

Network device 120 may receive the response message (i.e., one or more STC packets) from server 130 intended for client 110 (act 530). Application identifier 320 may then examine the STC packet(s) to verify the application associated with the initial communication session from client 110-1 (act 530).

For example, application identifier 320 may examine the STC packet(s) to ensure that the CTS packet(s) sent to server 130 was legitimate and that the CTS packet(s) was not part of, for example, a denial of service (DoS) attack. Application identifier 320 may perform the verification by determining whether the STC packet(s) sent in response to the initial communication from client 110-1 is a legitimate response or acknowledgement packet and that the response indicates that the original communication from client 110-1 was a recognized request, as opposed to being an unrecognizable message and/or recognized as being part of an attack on server 130. Assume that application identifier 320 verifies the identified application based on the STC packet(s).

Application identifier 320 may then store information in application database 330 based on the initial communication from client 110-1. For example, application identifier 320 may store the destination port number included in the initial CTS packet in port number field 410 along with information corresponding to the identified application in application field 440 (act 540). In an exemplary implementation, the initial CTS packet may include a TCP port field or a UDP port field. In these cases, application identifier 320 may use the information in this port field to identify the particular destination port number. Application identifier 320 may also store additional information in application database 330 (act 540). For example, in an exemplary implementation, application identifier 320 may store the protocol associated with the communication from client 110-1 in protocol field 420 and store information identifying the destination device (i.e., server 130 in this example) in destination field 430.

In this manner, application identifier 320 may populate application database 330 with information from a client 110-1 that associates a destination port number, a protocol, and/or a destination address to a particular application. Network device 120 may receive additional communications from various clients 110 and may populate application database 330 in a similar manner. That is, network device 120 may identify the particular application associated with a communication session from client 110, optionally verify the identified application based on one or more STC packets, and store the destination port number, protocol and/or destination address information in application database 330 along with information identifying the particular application. Network device 120 may then use this information to quickly identify, for example, applications being executed on non-traditional or non-standard ports on server 130 or otherwise unexpected ports on server 130.

For example, in conventional systems, port number 80 is a standard or traditional port that is used by server 130 executing an HTTP application. However, in some situations, server 130 may run various applications using different ports on server 130. As an example, server 130 may run a P2P application, an instant messaging (IM) application or another application via port number 80 of server 130. In this case, network device 120 may be able to identify applications that are being executed over non-standard or non-traditional ports based on information stored in application database 330, as described in more detail below.

Figure 6:
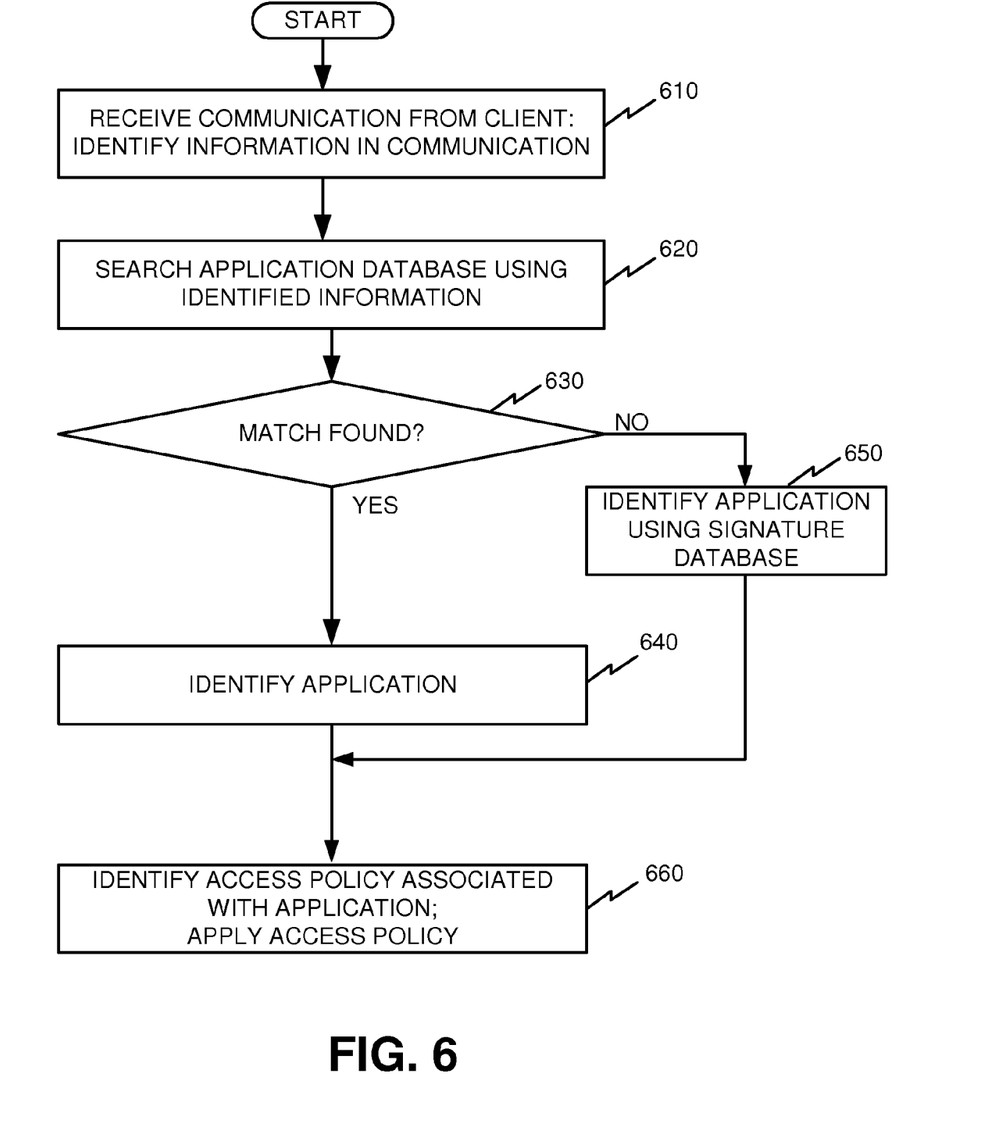
FIG. 6 is a flow diagram illustrating exemplary processing associated with identifying an application.

FIG. 6 is a flow diagram illustrating exemplary processing associated with identifying applications using information in application database 330. Processing may begin with a client, such as client 110-2, attempting to access server 130 and/or resources associated with server 130. Network device 120 may receive the access request in a manner similar to that described above with respect to FIG. 5 (act 610).

Application identifier 320 may then examine, for example, one or more packets in the CTS communication to identify particular information associated with the communication (act 610). For example, application identifier 320 may identify the destination port number, protocol and/or destination device (e.g., destination IP address) associated with the communication from client 110-2. This information may be included in the header of the first data packet transmitted from client 110-2.

Application identifier 320 may then use the identified destination port number, protocol and destination device to search application database 330 for an entry in which fields 410, 420 and 430 match the identified destination port number, protocol and destination device, respectively (act 620). If a match is found, application identifier 320 identifies the application stored in application field 440 for the matching entry (acts 630 and 640).

In the event that a match is not found, application identifier 320 may identify the application using signature database 310 (acts 630 and 650). That is, application identifier 320 may compare information (e.g., patterns, expressions, strings, etc.) in the communication from client 110-2 to identify a match or correspondence with information stored in signature database 310 in a manner similar to that described above with respect to FIG. 5. Assume that application identifier 320 identifies a match in signature database 310 and identifies an application associated with the match. In this case, application identifier 320 may populate application database 330 with information corresponding to the destination port, protocol and destination address in the communication from client 110-2.

In either case, after an application is identified, application identifier 320 may forward the identified application to policy logic 350. Policy logic 350 may then access policy database 340 to identify the access rules/policies associated with the particular application (act 660). Policy logic 350 may then apply the identified policy/rules to the communication session from client 110-2 to server 130 (act 660).

In this manner, network device 120 may quickly identify an application being executed by one of clients 110 by searching application database 330 as opposed to performing signature analysis for each communication or simply assuming that a communication to a particular port is always associated with a particular application. This ensures that application identifier 320 will identify the appropriate application, even when a particular application is running on a non-standard port of server 130. Identifying the correct application further ensures that correct access policies/rules will be applied to the communication session associated with the identified application.

In some implementations, network 100 may include a number of network devices similar to network device 120. In this case, information obtained from one network device, such as network device 120, may be shared with other network devices. For example, network device 120 may periodically send some or all of the information stored in application database 330 to other network devices involved in providing network security in network 100. The receiving network device may then compare the information stored in its own application database with the received information and add additional entries to its application database based on the received information. In this manner, information obtained by one network device (e.g., network device 120) may be quickly leveraged by other network devices to identify applications being executed by clients 110.

In addition, in some implementations, network device 120 may be used to identify a communication over a standard port that is not conforming to an application signature conventionally associated with the standard port or any other known application signature. For example, assume that a communication to or from port 80 of a server (e.g., server 130) does not match a signature associated with an HTTP application which is traditionally run on port 80. Further assume that the communication on port 80 does not match any other application signatures in signature database 310. In this case, network device 120 may determine that the server (e.g., server 130) may be a rogue server on network 100 that is posing as an HTTP server. In this case, network device 120 may apply security related rules and/or access policies for communications to and from that particular server.

CONCLUSION

Systems and methods described herein enable a network device to quickly identify an application being executed by a client. Policy rules may then be applied based on the identified application. Advantageously, this may permit a network device to provide access to a desired resource to large numbers of clients without consuming significant processing resources. Further, information obtained by one network device may be communicated to other devices to enable the other devices to leverage the obtained information.

In this disclosure, there is shown and described the preferred embodiments of the invention, but, as aforementioned, it is to be understood that the invention is capable of use in various other combinations and environments and is capable of changes or modifications within the scope of the inventive concept as expressed herein.

For example, implementations have been described with examples of a network device including particular logic devices/modules and databases. It should be understood that these logic modules/devices and/or databases may be combined in other implementations. In addition, implementations have been described as having a separate network device 120 providing various functions associated with communications intended for server 130. In other implementations, the functions performed by network device 120 may be included in server 130 or in another device associated with server 130.

Further, in the exemplary implementation described above, network device 120 was described as analyzing the first one or more packets from clients 110 to identify the application being executed. In some cases, a first packet received in a communication from one of clients 110 may not be the actual first data segment. That is, the packets may be sent out of order. In this case, application identifier 320 may check a transmission control protocol (TCP) sequence number to ensure that the data segment used for signature pattern matching and/or for identifying the port, protocol and/or destination device includes the appropriate information. That is, application identifier 320 makes sure that the first one or more packets are the sequential first packet(s) in a communication session.

In addition, some of the exemplary implementations described above referred to using the destination port number, protocol and destination device/address included in a CTS packet to identify the appropriate application in application database 330. In other implementations, the destination port number along with either the protocol or the destination address may be used to identify the appropriate application. In still other instances, the destination port number and other information associated with CTS packets may be used to identify the appropriate application.

Still further, aspects described herein have focused on identifying an application for security related purposes, such as using the identified application to identify security/access related rules/policies. In other implementations, the identified application may be used for any number of other purposes.

In addition, in some implementations, application identifier 320 may increase the level of granularity with which applications are identified. For example, application identifier 320 may identify that an Oracle application is being run on port 81 and that a manufacturing related or financial related application is being run inside the Oracle application. In this case, signature database 310 may store signature information that enables application identifier 320 to identify applications at this increased level of granularity (e.g., by manufacture, release/version number, etc.). This increased level of granularity with respect to the identified applications may allow network device 120 to further tailor its access policies associated with allowing clients 110 access to various resources in network 100. This increase level of granularity may also allow an entity associated with network 100 to get a better idea of traffic on network 100.

It will also be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects of the invention were described without reference to the specific software code—it being understood that one of ordinary skill in the art would be able to design software and control hardware to implement the aspects based on the description herein.

Further, certain portions of the invention may be implemented as "logic" that performs one or more functions. This logic may include hardware, such as a processor, microprocessor, an application specific integrated circuit or a field programmable gate array, software, or a combination of hardware and software, such as a processor/microprocessor executing instructions stored in a memory.

In addition, series of acts have been described with respect to FIGS. 5 and 6. The order of the acts may be varied in other implementations consistent with the invention. Moreover, non-dependent acts may be performed in parallel. Further, the invention is not limited to any specific combination of hardware circuitry and/or software.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

The scope of the invention is defined by the claims and their equivalents.

What is claimed:

1. A method comprising:
    receiving, by a network device, one or more packets from a client device;
    determining, by the network device and using particular information in the one or more packets, whether a first data structure stores an entry that includes information matching the particular information,
        the first data structure storing information identifying applications executed by client devices;
    identifying, by the network device and in the entry, information identifying a particular application being executed by the client device when the first data structure stores the entry that includes the information matching the particular information;
    comparing, by the network device, the particular information to information in a second data structure to identify the particular application being executed by the client device when the first data structure does not store the entry that includes the information matching the particular information,
        the second data structure storing signature information associated with one or more applications,
        comparing the particular information to the information in the second data structure including:
            searching for a pattern, in the second data structure, that matches a pattern in the one or more packets; and
    applying, by the network device, an access policy to determine whether to grant, to the client device, access to a resource in a network associated with the network device,
        the access policy being based on the particular application.

2. The method of claim 1, where receiving the one or more packets from the client device comprises:
    receiving, from the client device, a request to access the resource in the network, the one or more packets being associated with the request.

3. The method of claim 1, further comprising:
    identifying, as the particular information, a destination port number associated with the one or more packets, a protocol associated with the one or more packets, and a destination address associated with the one or more packets.

4. The method of claim 3, where determining whether the first data structure stores the entry that includes information matching the particular information includes:
    searching the first data structure using information identifying the destination port number, the protocol, and the destination address.

5. The method of claim 1, where the network device includes a firewall device or an intrusion detection system.

6. The method of claim 1, further comprising:
identifying, in a third data structure, the access policy based on the particular application,
the third data structure storing at least one of:
one or more policies associated with accessing one or more resources that include the resource, or
one or more rules associated with accessing the one or more resources.

7. A non-transitory computer-readable medium storing instructions, the instructions comprising:
one or more instructions which, when executed by a first device, cause the first device to receive a packet from a second device,
the first device being different than the second device;
one or more instructions which, when executed by the first device, cause the first device to search a first data structure, using particular information in the packet, to determine whether the first data structure stores an entry that includes information matching the particular information,
the first data structure storing information identifying applications executed by devices;
one or more instructions which, when executed by the first device, cause the first device to identify, in the entry, information identifying a particular application being executed by the second device when the first data structure stores the entry that includes the information matching the particular information;
one or more instructions which, when executed by the first device, cause the first device to compare the particular information to information in a second data structure to identify the particular application being executed by the second device when the first data structure does not store the entry that includes the information matching the particular information,
the second data structure being different than the first data structure, and
the second data structure storing signature information associated with one or more applications;
one or more instructions which, when executed by the first device, cause the first device to identify, in a third data structure and based on the particular application, a rule associated with accessing a resource in a network associated with the first device; and
one or more instructions which, when executed by the first device, cause the first device to selectively grant, to the second device and based on the rule, access to the resource in the network associated with the first device.

8. The non-transitory computer-readable medium of claim 7, where the third data structure stores at least one of:
one or more policies associated with accessing one or more resources, in the network, that include the resource, or
one or more rules associated with accessing the one or more resources.

9. The non-transitory computer-readable medium of claim 7, the instructions further including:
one or more instructions which, when executed by the first device, cause the first device to identify, as the particular information, a plurality of:
a destination port number associated with the packet,
a protocol associated with the packet, or
a destination address associated with the packet.

10. The non-transitory computer-readable medium of claim 9, where the one or more instructions to search the first data structure include:
one or more instructions which, when executed by the first device, cause the first device to search the first data structure using information identifying the plurality of the destination port number, the protocol, or the destination address.

11. The non-transitory computer-readable medium of claim 7, where the one or more instructions to receive the packet include:
one or more instructions which, when executed by the first device, cause the first device to receive, from the second device, a request to access the resource in the network, the packet being associated with the request.

12. The non-transitory computer-readable medium of claim 7, where the one or more instructions to compare the particular information to the information in the second data structure include:
one or more instructions which, when executed by the first device, cause the first device to search for a pattern, in the second data structure, that matches a pattern in the packet.

13. A device comprising:
a memory to store instructions; and
a processor to execute the instructions to:
receive a packet from another device different than the device,
the packet being associated with a request to access a resource in a network associated with the device,
search a first data structure, using particular information in the packet, to determine whether the first data structure stores an entry that includes information matching the particular information,
identify, in the entry, information identifying a particular application being executed by the other device when the first data structure stores the entry that includes the information matching the particular information,
the first data structure storing information identifying applications executed by devices,
compare the particular information to information in a second data structure to identify the particular application being executed by the other device when the first data structure does not store the entry that includes the information matching the particular information,
the second data structure being different than the first data structure, and
the second data structure storing signature information associated with one or more applications,
identify, based on the particular application, information associated with accessing the resource in the network, and
selectively grant, to the other device and based on the information associated with accessing the resource, access to the resource.

14. The device of claim 13, where, when identifying, based on the particular application, the information associated with accessing the resource in the network, the processor is to:
identify, in a third data structure and based on the particular application, a policy or a rule associated with accessing the resource in the network,
the third data structure being different than the first data structure and the second data structure,
where the third data structure stores at least one of:
one or more policies associated with accessing one or more resources, in the network, that include the resource, or
one or more rules associated with accessing the one or more resources.

15. The device of claim 13,
where, when comparing the particular information to the information in the second data structure, the processor is to:
search for a pattern, in the second data structure, that matches a pattern in the packet.

16. The device of claim 13, where the processor is further to:
identify, as the particular information, a destination port number associated with the packet, a protocol associated with the packet, and a destination address associated with the packet.

17. The device of claim 16, where, when searching the first data structure, the processor is further to:
search the first data structure using information identifying the destination port number, the protocol, and the destination address,
and
where the entry stores information identifying the destination port number, information identifying the protocol, information identifying the destination address, and the information identifying the particular application.

18. The device of claim 13, where, when selectively granting the access to the resource, the processor is to one of:
grant access to the resource,
deny access to the resource, or
limit access to the resource.

19. The method of claim 1, further comprising one of:
granting access to the resource based on applying the access policy;
denying access to the resource based on applying the access policy; or
limiting access to the resource based on applying the access policy.

20. The non-transitory computer-readable medium of claim 7, the one or more instructions to selectively grant access to the resource comprising one of:
one or more instructions to grant access to the resource;
one or more instructions to deny access to the resource; or
one or more instructions to limit access to the resource.

* * * * *